United States Patent
Goldwasser et al.

(10) Patent No.: US 9,801,431 B2
(45) Date of Patent: *Oct. 31, 2017

(54) REGRIND POLYURETHANE WITH GLYCOL OR POLYOL ADDITIVE

(71) Applicant: NIKE, Inc., Beaverton, OR (US)

(72) Inventors: David Jay Goldwasser, Hillsboro, OR (US); David G. Smith, Shanghai (CN)

(73) Assignee: NIKE, Inc., Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 15/004,416

(22) Filed: Jan. 22, 2016

(65) Prior Publication Data

US 2016/0135545 A1 May 19, 2016

Related U.S. Application Data

(63) Continuation of application No. 13/257,343, filed as application No. PCT/CN2010/001479 on Sep. 25, 2010, now Pat. No. 9,273,193.

(51) Int. Cl.

| | |
|---|---|
| *A43B 1/12* | (2006.01) |
| *A43B 23/24* | (2006.01) |
| *A43B 3/00* | (2006.01) |
| *C08G 18/83* | (2006.01) |
| *A43B 1/00* | (2006.01) |
| *B29B 17/00* | (2006.01) |
| *C08K 5/053* | (2006.01) |
| *B29D 35/12* | (2010.01) |
| *C08J 5/18* | (2006.01) |
| *B29K 75/00* | (2006.01) |
| *B29K 105/00* | (2006.01) |
| *B29K 105/26* | (2006.01) |

(52) U.S. Cl.
CPC ........... *A43B 23/24* (2013.01); *A43B 1/00* (2013.01); *A43B 1/12* (2013.01); *A43B 3/0078* (2013.01); *B29B 17/0005* (2013.01); *B29D 35/126* (2013.01); *C08G 18/831* (2013.01); *C08J 5/18* (2013.01); *C08K 5/053* (2013.01); *B29K 2075/00* (2013.01); *B29K 2105/0005* (2013.01); *B29K 2105/0094* (2013.01); *B29K 2105/26* (2013.01); *C08J 2375/04* (2013.01); *Y02W 30/683* (2015.05)

(58) Field of Classification Search
CPC .......... A43B 1/00; A43B 1/0063; A43B 1/12; A43B 1/14; B29D 17/005; B29D 35/12; B29D 35/126
USPC ............................ 523/167; 428/63; 264/37.3
See application file for complete search history.

(56) References Cited

U.S. PATENT DOCUMENTS 9,273,193 B2 * 3/2016 Goldwasser ............. A43B 1/12
2005/0048236 A1 * 3/2005 Watkins ................ A43B 13/206
428/35.7

* cited by examiner

*Primary Examiner* — Edward Cain
(74) *Attorney, Agent, or Firm* — Honigman Miller Schwartz and Cohn LLP; Matthew H. Szalach; Jonathan P. O'Brien

(57) ABSTRACT

A surface element including a recycled polyurethane and a glycol or polyol additive is provided. The surface element has an increased tearability as compared to the recycled polyurethane. An article of footwear and methods of preparing an article of footwear are also provided.

20 Claims, 1 Drawing Sheet

REGRIND POLYURETHANE WITH GLYCOL OR POLYOL ADDITIVE

CROSS-REFERENCE TO RELATED APPLICATIONS

This application is a continuation application of U.S. patent application Ser. No. 13/257,343 filed May 9, 2013, which is a 371 of PCT/CN2010/001479, filed Sep. 25, 2010, which are hereby incorporated herein by reference, each in its entirety.

FIELD

The present disclosure relates to methods of recycling polyurethane, and more particularly to methods of incorporating regrind thermoplastic polyurethane into a surface element.

BACKGROUND

This section provides background information related to the present disclosure which is not necessarily prior art.

A significant problem in the production and use of polyurethane resins is the disposal of thermally degraded and/or off-grade, polyurethane resins. For example, when a thermoplastic polyurethane (TPU) material is incorporated into various products or used to form products, waste material is generated. The waste material includes fully or partially thermally degraded resins, misformulated resins, or scrap resins. Much of the waste material with polyurethane in sheet form is the scrap edges from polyurethane materials that have been shaped using a mold. Although many efforts have been made to shape molds to minimize waste, the nature of using sheets of TPU necessarily generates scrap edges.

In prior systems, the waste material was discarded because it was not suitable for use in the original product. In still other systems, the scrap resin or misformulated resins was separated into small pieces, to form regrind, and the regrind was blended with virgin resin and used in the same application. Regretfully, only a limited amount of regrind can be used without sacrificing the desired properties of the particular polyurethane resin for the application.

Using regrind to provide different parts of an item or for use in a new item would reduce the need to create virgin thermoplastic polyurethane. Modifications to regrind use would provide alternatives to allow the scrap polyurethane from one component of a product to be used in a different component of the product or in a different product. Such modifications are environmentally friendly, beneficial in a production line, increase cost-effectiveness, minimize downtime and loss of plant resources, and minimize the need to produce and purchase virgin materials.

SUMMARY

This section provides a general summary of the disclosure, and is not comprehensive of its full scope or all of the disclosed features.

In various aspects, the present teachings provide a surface element including a recycled polyurethane and a glycol or polyol additive. The surface element has an increased tearability as compared to the recycled polyurethane.

In other aspects, the present teachings provide an article of footwear including: an upper, a midsole, an outsole, and a surface element. The surface element includes a recycled polyurethane and a glycol or polyol additive. The surface element has a melt index that is at least about three-fold greater than the melt index of the recycled polyurethane.

In still further aspects, the present teachings provide methods of preparing footwear having a surface element. A scrap polyurethane is collected from a shoe component. The scrap polyurethane has a first melt index and a first tearability. The scrap polyurethane is mixed with a glycol or polyol additive. The first melt index of the scrap polyurethane is increased. A sheet is formed of the polyurethane and glycol or polyol additive mixture. The sheet is applied to an outer region of an article of footwear. A perimeter of the sheet is torn to form the surface element.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Figure 1:
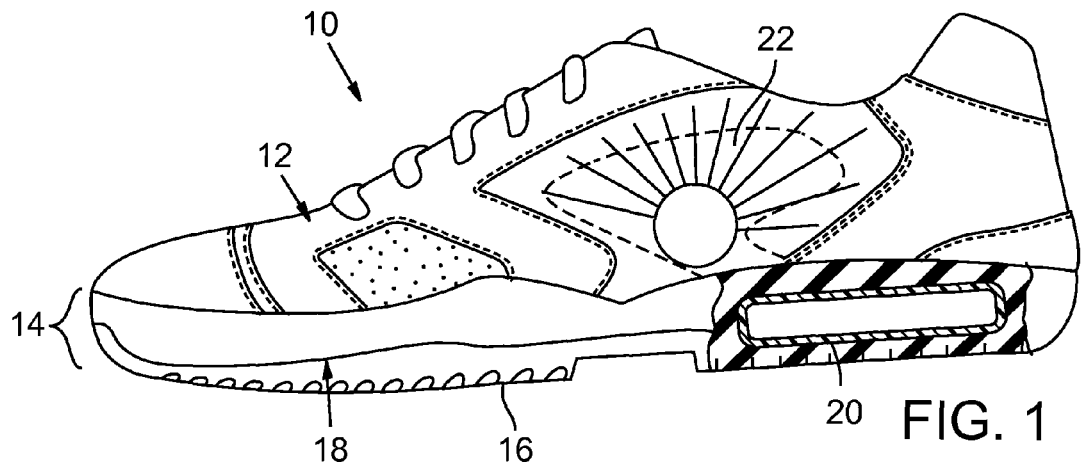
FIG. 1 depicts an article of footwear according to various aspects of the present teachings.

In various embodiments, the illustrations of the present teachings relate to an article of footwear 10 as shown in FIG. 1. Generally, the article of footwear 10 includes an upper 12 and a sole assembly 14. The sole assembly 14 is attached to the upper 12 and can include an outsole 16 and a midsole 18.

Optionally, the midsole 18 can include a bladder 20. The article of footwear 10 is depicted with an exemplary surface element 22.

While the illustrations and figures relate to an article of footwear, it is understood that the materials and methods detailed are also applicable to apparel such as shirts, patents, hats, gloves, and the like and also to sports equipment including balls, bats, masks, racquets, backboards, nets, and the like, as non-limiting examples.

Figure 2:
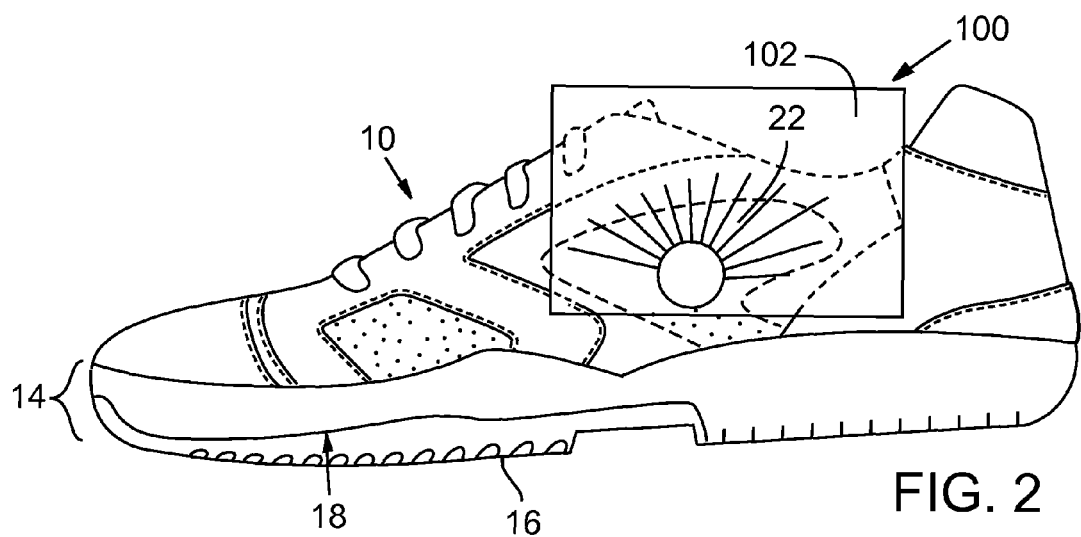
FIG. 2 depicts a surface element being applied to an article of footwear according to various aspects of the present teachings.
Figure 3:
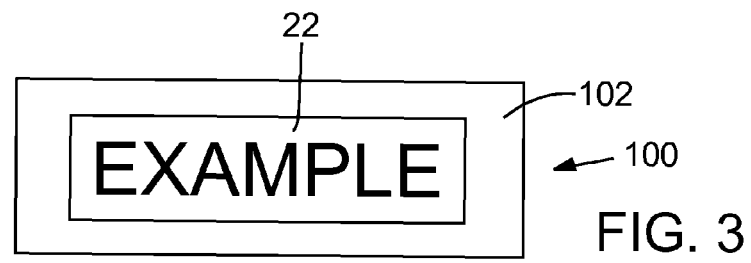
FIG. 3 depicts a sheet of material having a surface element according to various aspects of the present teachings.

Referring to FIGS. 1-3, examples of the surface element 22 are shown. The surface element 22 is also known as surface indicia, features, embellishments, or decorations, as non-limiting examples. The surface element 22 is made of a recycled polyurethane and a glycol or polyol additive. The surface element 22 has an increased tearability (or decreased tear resistance) as compared to the unmodified recycled polyurethane. "Tear resistance" and conversely, "tearability" as used herein can be defined and measured as set forth in ASTM D1004, incorporated by reference in its entirety. The increased tearability allows the surface element 22 to be shaped, torn, or cut without exerting a high force. For example, the increased susceptibility to tearing allows the surface element 22 to be torn by hand or easily removed by a machine without necessarily requiring a sharp die cutting tool or elaborate machinery. The increased tearability is selected to allow shaping and application of the surface element 22 without compromising its desired strength or durability.

The surface element 22 is any of a text, design, logo, mascot, or theme, as non-limiting examples. In various embodiments, the surface element 22 is made of a single color, finish, or pattern, or various combinations thereof. As shown in FIG. 1, the surface element 22 is an image of the sun while the example in FIG. 3 is text.

The source polyurethane is a scrap or spare material. The source polyurethane includes either a virgin material or material that has been recycled at least one time. As a non-limiting example, the source material traditionally would have been discarded because of a lack of apparent or easy re-use without cumbersome steps or significant costs. The present teachings help to eliminate this waste and provide an environmentally friendly alternative and cost-efficient use for the scrap or spare material.

In various embodiments, the polyurethane is sourced from the same material as the subject item (for example, from a component of an article of footwear), or the polyurethane is sourced from a different material wholly separate from the subject item, such as with a cross-industrial use (for example, a scrap material from an automotive component being recycled and incorporated into a home furnishing element). In various embodiments, the scrap or recycled polyurethane provides all of the source polyurethane in the system. In other embodiments, the polyurethane can be a mix of virgin and recycled materials. Such examples could include from about 5% to about 99% by weight or from about 55% to about 99% by weight of the recycled materials with the remainder of the urethane being a virgin material.

In various embodiments, the source polyurethane is a thermoplastic polyurethane. The thermoplastic urethane is either an ester- or ether-based urethane. Others polyurethanes include those selected from the group consisting of polyester, polyether, polycaprolactone, polyoxypropylene, and polycarbonate macroglycol based materials, and mixtures thereof. In various embodiments, the recycled polyurethane is formed of any polyurethane or a methylene diphenyl diisocyanate (MDI) or diisocyanate (DI) derivative. Among the useful isocyanates and diisocyanates in the source polyurethane include, but are not limited to, isophorone diisocyanate (IPDI), methylene bis 4-cyclohexyl isocyanate (H12MDI), cyclohexyl diisocyanate (CHDI), hexamethylene diisocyanate (HDI), m-tetramethyl xylene diisocyanate (m-TMXDI), p-tetramethyl xylene diisocyanate (p-TMXDI), and xylylene diisocyanate (XDI).

The source polyurethane is optionally cut or ground to form smaller particles for processing. Such materials are commonly known as regrind. The size of the regrind is selected for convenience, to achieve appropriate melting properties when the regrind is processing, or in light of the reaction parameters. In various embodiments, the source polyurethane is a combination of polyurethanes having different Shore hardnesses. For example, a mix of two polyurethanes having a Shore hardness of 65 A and a Shore hardness of 85 A, respectively, is employed in various embodiments. A mixture of polyurethanes having different Shore hardnesses further modulates the melt index of the surface element 22.

The recycled or regrind polyurethane has a starting melt index and tearability. Generally, the source polyurethane has a high melt index of up to 20, which would be lower than the melt index of the surface element 22 formed therefrom. The Examples provided later herein further illustrate the increase in melt index and tearability according to the present teachings.

In various embodiments, the glycol additive that is combined with the regrind or recycled polyurethane is selected from 1,4-butanediol, 1,3-butanediol, dipropylene glycol, 1,4-cyclohexane dimethanol, or tripropylene glycol. Similarly, any other difunctional alcohol or chain extenders, and combinations thereof, are able to be employed in the present teachings. Particular examples of such materials include, without limitation, ethylene glycol, diethylene glycol, and higher polyethylene glycol analogs like triethylene glycol; propylene glycol, and higher polypropylene glycol analogs like tripropylene glycol and tetrapropylene glycol; 1,3-propanediol, 1,6-hexanediol, 1,7-heptanediol, neopentyl glycol, dihydroxyalkylated aromatic compounds such as 4,4'-isopropylidene diphenol, (bisphenol A), resorcinol, catechol, hydroquinone, benzenedimethanols, the bis(2-hydroxyethyl)ethers of hydroquinone and resorcinol; p-xylene-α,α'-diol; the bis(2-hydroxyethyl)ether of p-xylene-α,α'-diol; m-xylene-α,α'-diol and the bis(2-hydroxyethyl) and alkylene oxide adducts of such diols. Other candidates include glycerin, trimethylolpropane, neopentyl glycol, and the like. Further, low molecular weight polyols formed by the reaction of a glycolic extender and a diacid such that the resulting polymer has a molecular weight below about 500 are also suitable. A single glycol or polyol additive or a plurality of different glycol additives and/or polyol additives is combined with the regrind polyurethane in the present teachings.

The glycol or polyol additive is added in a limited amount to the regrind polyurethane. Generally, the glycol or polyol additive is provided in an amount of less than about 10% by weight. In further embodiments, the glycol or polyol additive is added in an amount of about less than 5% by weight down to an amount of less than about 1% by weight. In preferred embodiments, the glycol or polyol is a liquid at room temperature to facilitate metering, however, low melting solids (120 degrees C. or less) are also successfully employed in the present teachings. In embodiments where the glycol or polyol has a relatively high boiling point, such as with tripropylene glycol and 1,4 cyclohexanedimethanol, fuming during processing and the formation of deposits on metal rolls during extrusion are reduced.

The amount of glycol or polyol added will provide the appropriate increase in flow rate and melt index for the particular combination of the glycol or polyol additive and the regrind polyurethane. In various embodiments, the amount of the glycol or polyol additive added is sufficient to provide a melt index of from about 50 to about 300, or a melt index that is several fold higher than the source polyurethane. It is believed that the melt index increases due to the glycol or polyol additive serving as a chain extender. This decreases the molecular weight of the resultant urethane which in turn increases flow and tearability.

An example method of measuring the melt index is provided in ASTM D1238, incorporated by reference in its entirety. Further, the addition of the glycol or polyol additive to the regrind polyurethane will decrease the molecular weight of the modified polymer as compared to the molecular weight of the starting recycled polyurethane.

Optionally, additional additives can be employed including, but not limited to, pigments, various stabilizers, flame retardants, wax, antioxidants, etc. For example, if added various plasticizers would increase the flexibility and durability of the final product as well as facilitate the processing of the material from a resinous form to a membrane or sheet useful for a surface element. Fillers are also optionally included, such as fibrous and particulate materials, non-polar polymeric materials and inorganic anti-block agents. Still other additives or processing aids are optionally included such as mold release agents and lubricants, as are known in the art. Any of these additives are either provided with the source polyurethane or are added at a different processing step. It is understood that the additives will not significantly alter the desired melt index and ease of tearing for the surface element 22. It is understood that combinations of the additives allow for customization of color and texture, for example, of the surface element 22.

As illustrated in the Examples, the surface element 22 may have a melt index that is at least about three-fold greater than the melt index of the source regrind polyurethane. In various embodiments, the surface element 22 has a melt index of at least 100 grams/10 minutes at 190 degrees C./8700 sec. The higher melt index as compared to that of the source polyurethane indicates a better propensity to flow and facilitates more easily applying the surface element 22 to the underlying substrate.

According to various embodiments of the present teachings, methods of preparing a surface element 22 for an article of footwear 10 are provided. To prepare the surface element 22, source polyurethane, for example, at least partly from scraps of a shoe component (bladder, sole, upper, etc.) is used.

As detailed above, the source material is a polyurethane regrind that has a starting Shore A hardness and a melt index. If desired, the hardness of the source polyurethane can be reduced by blending it with a softer polyurethane. Also, if desired, a small amount of a virgin polyurethane (10% or less by weight) is added.

The glycol or polyol is then added in the desired amount, preferably less than about 10% by weight. In some embodiments, the polyurethane stream and glycol or polyol are processed on a twin screw extruder by adding the latter via a metering pump. The polyurethane stream is added via a loss in weight feeder that allows a constant ratio between the two materials to be maintained. In other embodiments, the glycol or polyol is added to the feed throat, to a downstream port, or into the melt via an injector, for example. The extruder output is optionally either strand pelletized or pelletized via an underwater pelletizer or other methods well known to the art. In such embodiments, the melting and mixing of the two ingredients is controlled by process conditions and the twin screw extruder feed is less affected by the lubricating effect of the glycol or polyol addition. Additives such as those listed above are optionally added during the compounding process.

In still other embodiments, the glycol or polyol is added to the polymer as a master batch that can be made in a non-fluxing batch mixer by spraying the glycol or polyol from a number of nozzles that are fed by a metering pump. The source polyurethane absorbs up to about 5% of glycol or polyol and forms a free flowing mix. The absorption process is sped up by warming the mix to a suitable temperature, for example to about 80 degrees C. Regrind is particularly suited for such processes because the irregular shape of regrind particles speeds up the absorption of the glycol or polyol. The regrind that has absorbed the glycol or polyol is run through an extruder if it contains the correct amount of glycol or polyol, or it can be treated as a master batch and be blended with source polyurethane that does not contain glycol or polyol, for instance. This minimizes heat addition and slippage of the polyurethane during the single screw extrusion.

Yet another addition method is to simply pump the glycol or polyol from a metering pump into the feed throat of the extruder using an injection port in the barrel or an injection port on the screw. The ratio of glycol or polyol to polyurethane is controlled, such as by using a metering pump and screw speed as known in the art.

With reference to FIGS. 2 and 3, regardless of the technique selected, in various embodiments, the materials provide a sheet 100 or another suitable shape. The sheet 100 or a region of the sheet is applied to an outer region of the article of footwear 10. The footwear 10 can be assembled when the surface element 22 is applied, as illustrated, or the surface element can be applied to a distinct component of the article of footwear 10 prior to assembly thereof. In various embodiments, the sheet 100 is either pre-formed in a particular shape such that no extra surface element material is used, or the sheet is a universal shape. The surface element 22 is applied to the region of the article of footwear 10 and the perimeter 102 of the sheet outside of the weld lines about the desired shape (or surface element 22) is removed. In such embodiments, the perimeter 102 of the sheet 100 is removed to form the surface element 22. The melt index allows the perimeter 102 to be ripped cleanly away around the weld without disturbing the surface element fixed to the article of footwear 10. Any scrap material from the sheet 100 can be recycled or reused to form other areas of a surface element 22. In various embodiments, the sheet 100 optionally includes perforations (not shown) to facilitate easy removal of the surface element 22.

The surface element 22 is fixed to the article of footwear 10. Application methods include RF welding, heat transfer, laminating, and the like. The surface element 22 is able to be applied to any of the upper 12, midsole 18, or outsole 16 of the article of footwear 10. The article of footwear 10 includes any type of shoe, boot, or sandal. In various embodiments, the article of footwear 10 is an athletic shoe.

In various embodiments, the sheet 100 includes a plurality of surface elements 22. In such embodiments, the surface elements 22 can be placed along different areas of an article of footwear 10 or on different articles of footwear 10. Providing the sheet 100 with the plurality of surface elements 22 makes the system more cost-effective and further minimizes generation of scrap materials.

As detailed above, the surface element 22 can also be applied to apparel and/or sports equipment. In such embodiments, the application methods can be modified to include stitching, in addition to the above application methods. The application conditions, such as temperature and amount of pressure exerted, are modified for the respective substrate.

The following Examples provide illustrations of the present teachings.

EXAMPLES

A thermoplastic polyurethane (TPU) sheet was produced that was approximately 3 feet wide, having different gauges, and showing either smooth/fine matte or matte/fine matte finishes. The feed was an ester-based thermoplastic polyurethane regrind derived from methylene diphenyl diisocyanate (MDI) that had a Shore hardness of 90 A and a melt index of 9.4 grams/10 minutes at 190 degrees C./8700 grams. Also, 4% of a TPU concentrate that contained a UV stabilizer and a small amount of a blue tint were included in the mixture. The sheet was processed on a 3.5 inch extruder equipped with a 3-roll stand. 1,4-butanediol (BDO) was added via a metering pump to the extruder feed throat. The amount of BDO added was a few tenths of a percent. As shown in Table 1, the final sheet tested and labeled Samples 1-10 had melt indexes of from about 30 to 60 grams/10 minutes at 190 degrees C./8700 grams. The melt index of the control sheet extruded from a similar regrind without the BDO was only 16 grams/10 minutes at 190 degrees C./8700 grams, also shown in Table 1.

TABLE 1

| Sample Number | Finish | Thickness mm | Melt Index (190 C./ 8700) | Direction | TS psi | Percent Elongation | Modulus at: 50% psi | 100% psi | 200% psi | 300% psi | Die C (pli) |
|---|---|---|---|---|---|---|---|---|---|---|---|
| 1 | matte/ fine matte | 0.3 | 51 | machine direction | 12160 | 541 | 1123 | 1314 | 1862 | 3629 | 782 |
|  |  |  |  | transverse direction | 11976 | 598 | 1051 | 1207 | 1586 | 2719 | 807 |
| 2 | matte/ fine matte | 0.5 | 31 | machine direction | 9912 | 551 | 1055 | 1228 | 1660 | 2947 | 717 |
|  |  |  |  | transverse direction | 10161 | 561 | 858 | 986 | 1356 | 2597 | 726 |
| 3 | matte/ fine matte | 0.7 | 59 | machine direction | 8948 | 564 | 977 | 1135 | 1449 | 2319 | 680 |
|  |  |  |  | transverse direction | 8702 | 530 | 924 | 1951 | 1401 | 2592 | 704 |
| 4 | matte/ fine matte | 0.8 | 42 | machine direction | 8744 | 526 | 1038 | 1171 | 1588 | 2871 | 676 |
|  |  |  |  | transverse direction | 8058 | 567 | 951 | 1063 | 1405 | 2394 | 687 |
| 5 | matte/ fine matte | 1 | 40 | machine direction | 10638 | 578 | 1090 | 1239 | 1657 | 2730 | 660 |
|  |  |  |  | transverse direction | 10302 | 572 | 1104 | 1235 | 1645 | 2821 | 674 |
| 6 | smooth/ fine matte | 0.3 | 51 | machine direction | 12284 | 594 | 1181 | 1384 | 1869 | 3103 | 770 |
|  |  |  |  | transverse direction | 10022 | 612 | 1015 | 1176 | 1571 | 2837 | 773 |
| 7 | smooth/ fine matte | 0.5 | 40 | machine direction | 9934 | 487 | 1087 | 1331 | 2027 | 3874 | 725 |
|  |  |  |  | transverse direction | 9669 | 592 | 944 | 1079 | 1360 | 2285 | 790 |
| 8 | smooth/ fine matte | 0.7 | 31 | machine direction | 8758 | 542 | 906 | 1063 | 1456 | 2469 | 642 |
|  |  |  |  | transverse direction | 8661 | 563 | 1033 | 1157 | 1482 | 2513 | 649 |
| 9 | smooth/ fine matte | 0.8 | 44 | machine direction | 9375 | 586 | 984 | 1140 | 1458 | 2293 | 678 |
|  |  |  |  | transverse direction | 8961 | 572 | 955 | 1078 | 1367 | 2222 | 674 |
| 10 | smooth/ fine matte | 1 | 42 | machine direction | 8391 | 607 | 866 | 982 | 1274 | 2111 | 665 |
|  |  |  |  | transverse direction | 7875 | 573 | 869 | 975 | 1254 | 1997 | 645 |

TABLE 1-continued

| Sample Number | Finish | Thickness mm | Melt Index (190 C./8700) | Direction | TS psi | Percent Elongation | Modulus at: 50% psi | 100% psi | 200% psi | 300% psi | Die C (pli) |
|---|---|---|---|---|---|---|---|---|---|---|---|
| control sheet without BDO | matte/matte | 1 | 16 | machine direction | 8336 | 520 | 1076 | 1290 | 1799 | 3108 | 687 |
| | | | | transverse direction | 8407 | 519 | 1030 | 1194 | 1610 | 2846 | 693 |

As shown in Table 2, Samples 11-18 contained either 2% or 5% BDO in a TPU regrind with a melt index ranging for 8 to 20 grams/10 minutes at 190 degrees C./8700 grams. Samples 11-18 were prepared according to Table 2 by mixing the respective BDO and TPU regrind in a non-fluxing mixer run at 80 degrees C. Different amounts of the samples were combined with regrind that was free of 1,4-butanediol and then extruded into sheet. The TPU regrind was ester-based and had a melt index of 20 grams/10 minutes at 190 degrees C./8700 grams. As shown in Table 3, the melt index of Samples 11-18 increased multiple-fold with increasing amounts of 1,4-butanediol.

TABLE 2

| Sample Number | Percent of 2% BDO Additive | Percent of 5% BDO Additive | Percent of BDO in feed | Melt Index in grams/10 minutes 190 C. 8700 grams |
|---|---|---|---|---|
| 11 | 5 | — | 0.1 | 54 |
| 12 | 7.5 | — | 0.15 | 40 |
| 13 | — | 2 | 0.1 | 54 |
| 14 | — | 3 | 0.15 | 68 |
| 15 | 25 | — | 0.5 | 64 |
| 16 | — | 10 | 0.5 | 80 |
| 17 | — | 16 | 0.8 | 140 |
| 18 | — | 20 | 1 | 110 |
| control | none | none | 0 | 30 |

As shown in Table 3, the melt index of Samples 11-18 increased with increasing amounts of 1,4-butanediol. Notably, Sample 18 contained 1% BDO in the feed and had a Die C tear strength of only 564 pounds/inch. Sample 15, for example, contained 0.5% BDO in the feed and had a Die C tear strength of 693.5 pounds/inch. To the contrary, the control without any BDO had a Die C tear Strength of 722.5 pounds/inch. This demonstrates that the increase in BDO concentration decreases the tear strength (or conversely increases the ease of tearing).

TABLE 3

| Sample Number | MI | Tensile strain, psi | Failure strain, percent | Modulus at 50%, psi | 100%, psi | 200%, psi | 300%, psi | Die C Tear Strength (lb/in) |
|---|---|---|---|---|---|---|---|---|
| 11 | 54 | 8560 | 557 | 990.5 | 1170 | 1590 | 2660 | 674.5 |
| 12 | 40 | 9415 | 548 | 1090 | 1290 | 1765 | 3025 | 762.5 |
| 13 | 54 | 8435 | 532.5 | 1006.5 | 1165 | 1515 | 2495 | 692.5 |
| 14 | 68 | 8215 | 532.5 | 1060 | 1215 | 1615 | 2645 | 676.5 |
| 15 | 64 | 8210 | 509.5 | 1045 | 1215 | 1600 | 2655 | 693.5 |
| 16 | 80 | 8575 | 573.5 | 1130 | 1285 | 1610 | 2500 | 739 |
| 17 | 140 | 5100 | 496 | 970 | 1075.5 | 1265 | 1740 | 600.5 |
| 18 | 110 | 6650 | 561 | 916 | 1016.5 | 1225 | 1845 | 564 |
| control | 30 | 9860 | 523.5 | 1139.5 | 1340 | 1880 | 3395 | 722.5 |

As shown in Table 4, Samples 21-25 were prepared from a 90 A ester-based regrind and/or a 75 A ester based TPU, both of which were derived from MDI. A 90 A ester based TPU regrind infused with 4% of 1,4 BDO was added to the respective materials. The melt index of the regrind was 8-20 grams/10 minutes at 190 degrees C./8700 sec. The test was performed on a 3.5 inch extruder equipped with a melt pump and a 3-roll stand. The blends were extruded into sheet that was 0.7 millimeters thick by 3 feet wide.

TABLE 4

| | Sample Number | | | | |
|---|---|---|---|---|---|
| | 21 | 22 | 23 | 24 | 25 |
| Regrind | 0.362 | 0.347 | 0.607 | 0.996 | 0.949 |
| TM-75A Coating resin | 0.543 | 0.520 | 0.260 | 0.001 | 0.000 |
| Blue pigment | 0.001 | 0.001 | 0.001 | 0.002 | 0.001 |
| UV stabilizer | 0.002 | 0.002 | 0.002 | 0.000 | 0.002 |
| BDO infused regrind | 0.091 | 0.130 | 0.130 | 0.000 | 0.047 |
| BDO | 0.360% | 0.520% | 0.520% | 0.000% | 0.190% |

The properties of Samples 21-25 are provided in Table 5. The increased amount of BDO or BDO infused regrind decreased the Die C tear strength of the samples.

TABLE 5

| | Sample Number | | | | |
|---|---|---|---|---|---|
| | 21 | 22 | 23 | 24 | 25 |
| Melt Index (190 C./8700 grams) | 142.6 | 97.3 | 82.6 | — | 36.5 |

TABLE 5-continued

| | Sample Number | | | | |
|---|---|---|---|---|---|
| | 21 | 22 | 23 | 24 | 25 |
| Thick (mm) | 0.68~0.70 | 0.7 | 0.71 | 0.74~0.78 | 0.74 |
| Durometer (Shore A) | 86 | 87 | 86~87 | 92~93 | 93 |
| Specific Gravity (g/cc) | 1.205 | 1.22 | 1.1925 | 1.216 | 1.2036 |
| Tensile Strength (psi) | 4483.1 | 5063.5 | 8306.0 | 6778.7 | 7641.4 |
| Elongation (%) | 561.1 | 489.5 | 598.0 | 380.0 | 422.3 |
| 300% (psi) | 1504.5 | 1973.9 | 1559.2 | 4143.4 | 3537.7 |
| Die C tear (lb/in) | 494.9 | 554.3 | 504.3 | 575.8 | 632.1 |
| YI | 2.06 | 1.21 | 2.43 | 2.73 | 2.32 |

With respect to Samples 26-35, the effect of BDO level on the melt index of a 90 A TPU regrind was determined. The test was performed on a 3.5 inch extruder equipped with a melt pump and a 3-roll stand. The product was a sheet that was 3 feet wide by 0.7 mm thick. The BDO was added through the extruder screw. As illustrated in Table 6, the melt index increased with the level of BDO added.

TABLE 6

| Sample | Estimated BDO concentration | Melt Index (grams/10 minutes at 190 degrees C. 8700 grams) | Barrel Pressure (psi) |
|---|---|---|---|
| 26 | 0.38 | 66 | 2080-2140 |
| 27 | 0.46 | 77 | 2050-2120 |
| 28 | 0.5 | 77 | 2000-2080 |
| 29 | 0.65 | 80 | 1840-1960 |
| 30 | 0.7 | 82 | 1730-1810 |
| 31 | 0.74 | 112 | 1580 |
| 32 | ~0.88 | 136 | Reduced screw |
| 33 | ~0.9 | 150 | Reduced screw |
| 34 | ~0.97 | 200 | Reduced screw |
| 35 | ~1.11 | 212 | Reduced screw |

Additional information on Samples 33 and 34 is provided in Table 7, including the notably increased melt index of the Samples.

TABLE 7

| Sample Number | MI | Tensile strain, psi | Failure strain, percent | Modulus at 50%, psi | 100%, psi | 200%, psi | 300%, psi | Die C tear Strength (lb/in) |
|---|---|---|---|---|---|---|---|---|
| 33 | 150 | 7446.5 | 594.5 | 1026 | 1108.5 | 1318.5 | 1956 | 632.5 |
| 34 | 200 | 6430.5 | 580 | 805.5 | 884 | 1085 | 1680.5 | 660 |

With respect to Samples 36 to 39 in Table 8, the effect of adding BDO either by using a masterbatch that contained 4% BDO on a 90 A ester based TPU regrind that was derived from MDI was compared with the effect of adding BDO by injection through the screw. The feed contained 30% of an ester based TPU derived from MDI with a Shore A hardness of 65 A. The balance of the feed was either a 90 A ester based regrind derived from MDI or a mix of the 4% BDO master batch with the 90 A ester based regrind derived from MDI. The test was performed on a 3.5 inch extruder equipped with a melt pump and a 3-roll stand. The product was a sheet that was 3 feet wide by 0.7 millimeters thick. The BDO was added through the extruder screw. Similar results were obtained using both methods.

TABLE 8

| | Sample Number | | | | |
|---|---|---|---|---|---|
| | Control | 36 | 37 | 38 | 39 |
| Regrind | 70% | 60% | 55% | 70% | 70% |
| TB65-AM | 30% | 30% | 30% | 30% | 30% |
| 4% 1,4 BDO infused regrind added | | 10% | 15% | | |
| BDO added (%) | | 0.40% | 0.60% | | |
| % BDO added by Liquid addition | | | | 0.40% | 0.60% |
| Barrel Pressure (psi) | 3680 | 3280 | 3140 | 3160 | 3175 |
| Melt Pump pressure (psi) | 680 | 610 | 490 | 390 | 340 |
| Roll speed | 7 | 7 | 7 | 7 | 7 |
| Roll deposits | none | slight haze | heavy haze | slight haze | heavy haze |
| Melt Index (grams/10 minutes at 190 degrees C./8700 grams) | 49 | 79 | 78 | 91 | |
| Molecular Weight (Mw) | | 120000 | 88300 | 84000 | 80700 |
| Molecular Weight per Number Average Molecular Weight (Mw/Mn) | | 2.22 | 2.04 | 2 | 1.99 |
| Melt Index (190 C./8700 grams) | | 51 | 96 | 104 | 136 |

Samples 40 to 45 were prepared according to Table 9 to examine the effect of using different types of glycols. The feed included an ester-based TPU derived from MDI that had a Shore A hardness of 65 A, a virgin ester-based TPU derived from MDI, and a 90 A ester-based regrind derived from MDI. The starting mixture had a melt index between 8 and 20 grams/10 minutes at 190 degrees C./8700 grams. The glycols were added through the screw. Tripropylene glycol (TPG) and 1,4 cyclohexane dimenthanol (CHDM) produced fewer roll deposits and fumes than glycerin or BDO.

TABLE 9

| | hardness Shore A | 40 | 41 | 42 | 43 | 44 | 45 |
|---|---|---|---|---|---|---|---|
| Virgin 90 A TPU | 90 A | 10% | 10% | 10% | 10% | 10% | 10% |
| 90 A TPU regrind | 90 A | 60% | 60% | 60% | 60% | 60% | 60% |

TABLE 9-continued

| | hardness Shore A | 40 | 41 | 42 | 43 | 44 | 45 |
|---|---|---|---|---|---|---|---|
| TPU (Coating company TB-65AL) | 65 A | 30% | 30% | 30% | 30% | 30% | 30% |
| UV stabilizer | | 0.25% | 0.25% | 0.25% | 0.25% | 0.25% | 0.25% |
| Blue pigment | | 0.15% | 0.15% | 0.15% | 0.15% | 0.15% | 0.15% |
| Extender | | None | 1,4 BDO | Glycerin | TPG | TPG | CHDM |
| Extender level | | | 0.60% | 0.40% | 1.30% | 0.60% | 0.96% |
| Barrel Pressure (psi) | | 2550 | 1790 | 1840 | 1400 | 1600 | |
| Melt Pump pressure (psi) | | 620 | 500 | 530 | 380 | 580 | |
| Screw (RPM) | | 19.5 | 19.3 | 19.0 | 18.8 | 18.8 | |
| Sheet thickness (mm) | | 0.7 | 0.7 | 0.7 | 0.7 | 0.7 | 0.7 |
| Melt Index (grams/10 minutes at 190 degrees C./8700 grams) | | 25 | 145 | 200 | 390 | 122 | 124 |
| Roll fog | | none | some | a lot | low | low | low |

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An article of footwear or a component of an article of footwear having a surface element, prepared by a method comprising:
    providing scrap polyurethane, wherein the scrap polyurethane has a first melt index and a first tearability;
    mixing the scrap polyurethane with a glycol or polyol additive;
    increasing the first melt index;
    forming a sheet from the polyurethane and glycol or polyol additive mixture;
    applying an area of the sheet to an outer region of an article of footwear or a component of an article of footwear; and
    forming the surface element, wherein forming the surface element comprises
    tearing away a perimeter of the sheet around the area.

2. An article of footwear or a component of an article of footwear having a surface element according to claim 1, wherein increasing the first melt index comprises increasing the melt index of the scrap polyurethane by at least threefold.

3. An article of footwear or a component of an article of footwear having a surface element according to claim 1, wherein the scrap polyurethane and glycol or polyol additive are melted together.

4. An article of footwear or a component of an article of footwear having a surface element according to claim 1, wherein applying the area of the sheet comprises laminating the area of the sheet onto the footwear or the component of an article of footwear.

5. An article of footwear or a component of an article of footwear having a surface element according to claim 1, wherein additives are added to the scrap polyurethane or to the mixture of the scrap polyurethane with the glycol or polyol additive such that the surface element has an appearance selected from the group consisting of matte appearance and shiny appearance.

6. An article of footwear or a component of an article of footwear having a surface element according to claim 1, wherein the scrap polyurethane comprises scrap polyurethane from a shoe component.

7. An article of footwear or a component of an article of footwear having a surface element according to claim 1, wherein forming the surface element comprises tearing away a perimeter of the sheet around the area.

8. An article of footwear or a component of an article of footwear having a surface element according to claim 7, further comprising applying the perimeter of the sheet to a region of the article of footwear to form a second surface element.

9. An article of footwear or a component of an article of footwear having a surface element according to claim 1, wherein the surface element has a melt index of at least 100 grams/10 minutes at 190 C/8700 grams as provided by ASTM D1238.

10. An article of footwear or a component of an article of footwear having a surface element according to claim 1, wherein the glycol or polyol additive comprises butanediol.

11. An article of footwear or a component of an article of footwear having a surface element according to claim 1, wherein the surface element comprises less than about 5% of the glycol or polyol additive by weight.

12. An article of apparel or sports equipment with a surface element prepared by a method comprising:
    providing recycled polyurethane, wherein the recycled polyurethane has a first melt index and a first tearability;
    mixing the recycled polyurethane with a glycol or polyol additive;
    increasing the first melt index;
    forming a sheet from the polyurethane and glycol or polyol additive mixture;
    applying an area of the sheet to an outer region of an article of apparel or sports equipment; and
    forming the surface element, wherein forming the surface element comprises
    tearing away a perimeter of the sheet around the area.

13. An article of apparel or sports equipment with a surface element according to claim 12, wherein increasing the first melt index comprises increasing the melt index of the recycled polyurethane by at least three-fold.

14. An article of apparel or sports equipment with a surface element according to claim 12, wherein applying the area of the sheet comprises laminating the area of the sheet onto the article of apparel or sports equipment.

15. An article of apparel or sports equipment with a surface element according to claim 12, wherein additives are added to the recycled polyurethane or to the mixture of the recycled polyurethane with the glycol or polyol additive, such that the surface element has an appearance selected from the group consisting of matte appearance and shiny appearance.

16. An article of apparel or sports equipment with a surface element according to claim 12, wherein the recycled polyurethane comprises scrap polyurethane from a shoe component.

17. An article of apparel or sports equipment with a surface element according to claim 12, wherein forming the surface element comprises tearing away a perimeter of the sheet around the area.

18. An article of apparel or sports equipment with a surface element according to claim 12, wherein the surface element has a melt index of at least 100 grams/10 minutes at 190 C/8700 grams as provided by ASTM D1238.

19. An article of apparel or sports equipment with a surface element according to claim 12, wherein the glycol or polyol additive comprises butanediol.

20. An article of apparel or sports equipment with a surface element according to claim 12, wherein the surface element comprises less than about 5% of the glycol or polyol additive by weight.

\* \* \* \* \*